May 15, 1934.  H. G. SAAL  1,958,801
AUTOMATIC PHONOGRAPH RECORD CHANGING MEANS AND METHOD
Filed March 16, 1931  6 Sheets-Sheet 2
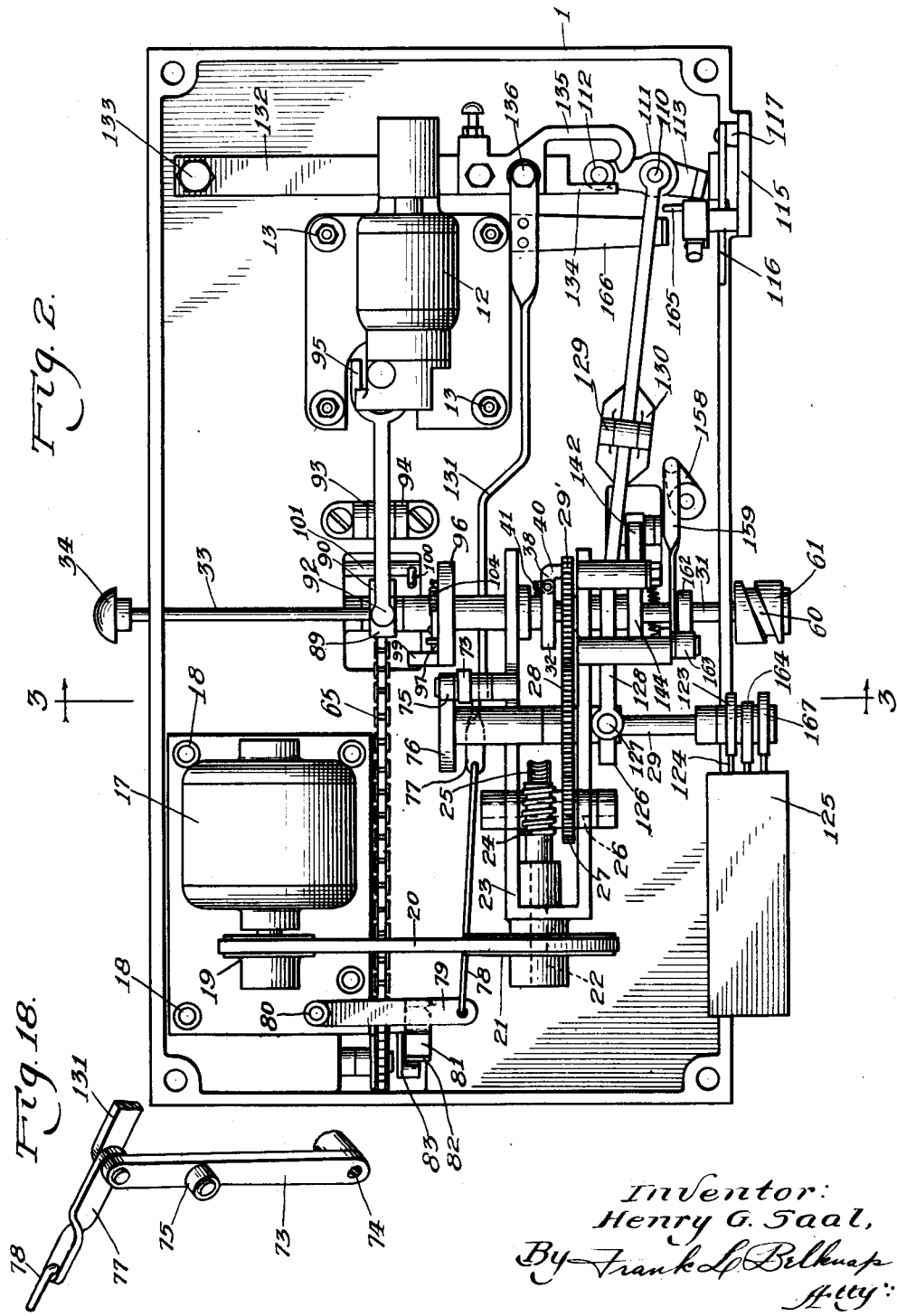
Inventor:
Henry G. Saal,
By Frank L. Belknap
Atty.

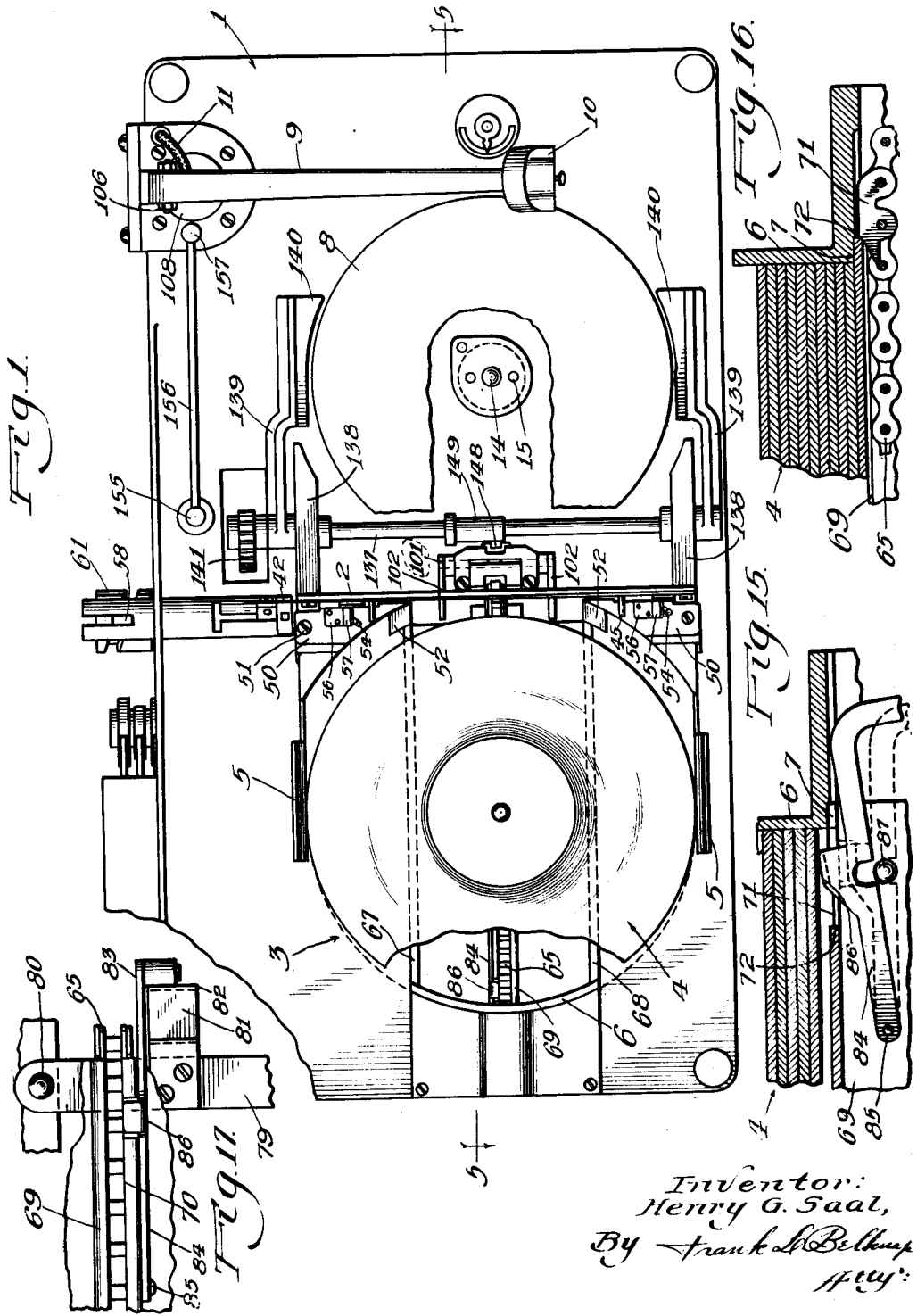

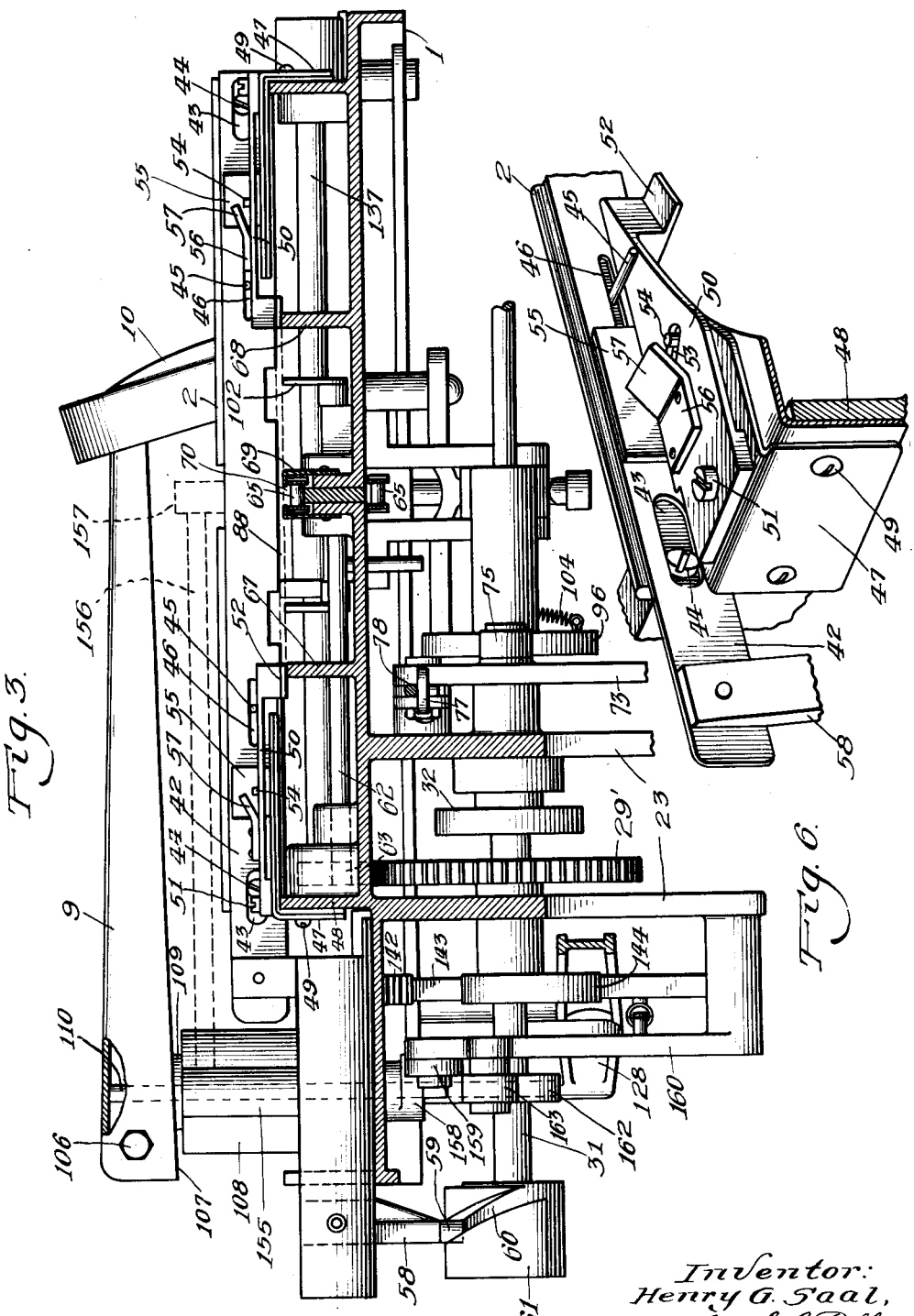

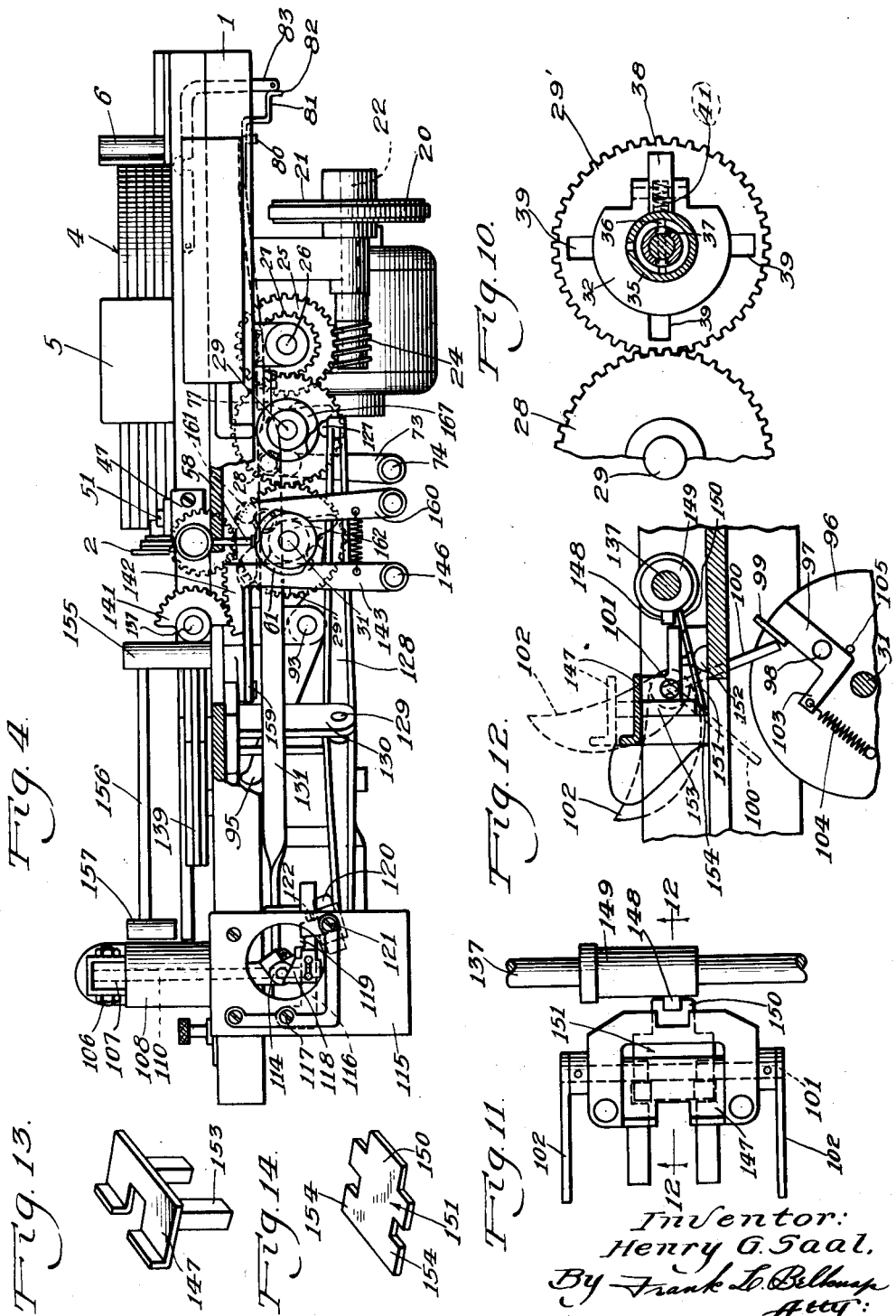

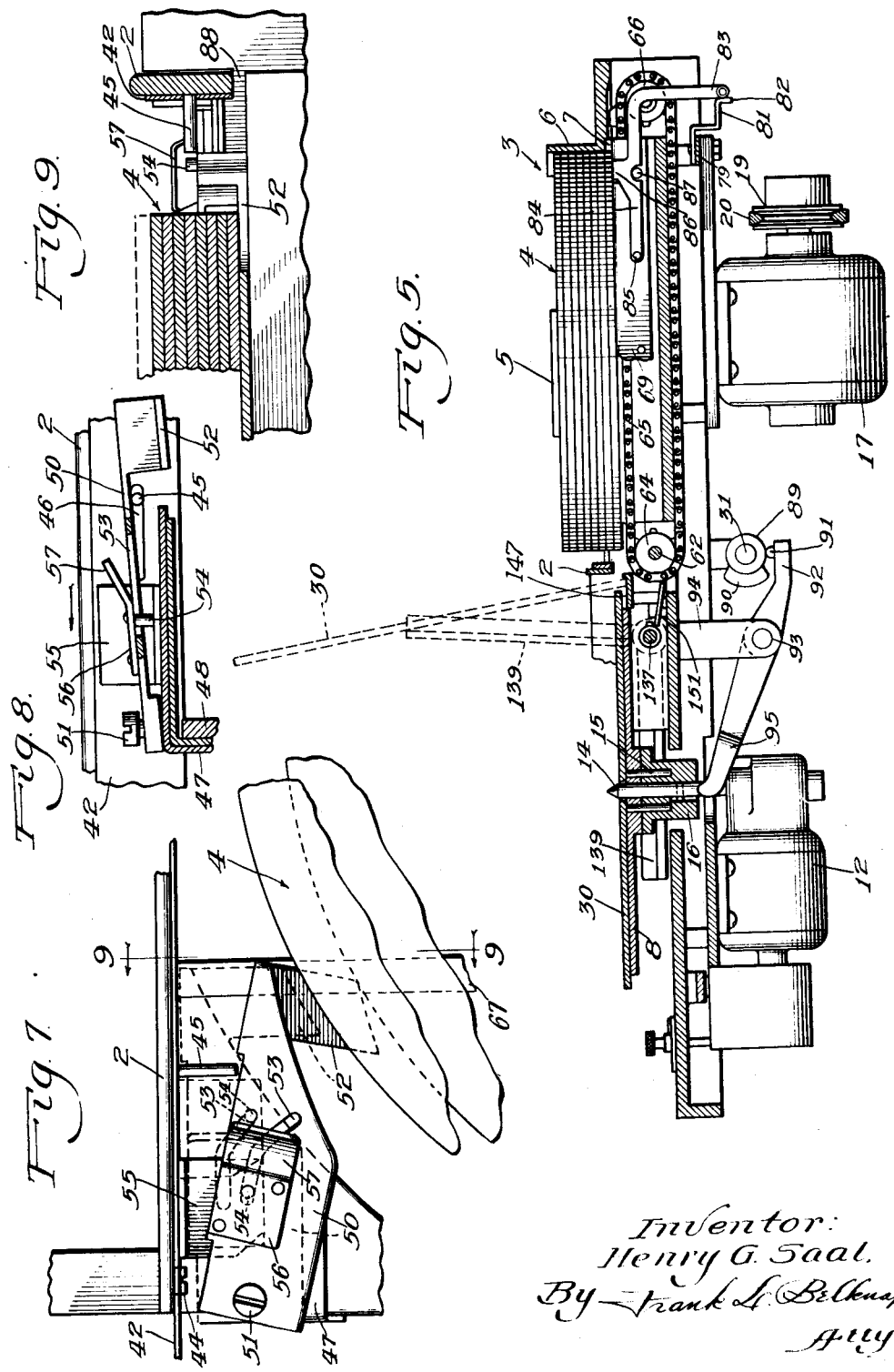

May 15, 1934.  H. G. SAAL  1,958,801
AUTOMATIC PHONOGRAPH RECORD CHANGING MEANS AND METHOD
Filed March 16, 1931  6 Sheets-Sheet 6

Inventor:
Henry G. Saal,
By Frank L. Belknap
Atty.

Patented May 15, 1934

1,958,801

UNITED STATES PATENT OFFICE 1,958,801

AUTOMATIC PHONOGRAPH RECORD CHANGING MEANS AND METHOD

Henry G. Saal, McHenry, Ill.; Alice M. Saal and Vena Linwood Foulds, executrices of the estate of said Henry G. Saal, deceased Application March 16, 1931, Serial No. 522,813

8 Claims. (Cl. 274—10)

This invention relates to improvements in automatic phonograph record changing devices and refers specifically to the provision of a method and means whereby the order of playing of a group of records may be interrupted and a record upon the turntable replayed without interfering with the timing of the mechanism as a whole, and in addition in automatically changing the records the records may be handled in such a manner as not to injure or deface them.

The utility, objects and advantages of my invention will be apparent from the accompanying drawings and following detail description.

In the drawings, Fig. 1 is a top plan view of a device embodying the principles of my invention.

Fig. 2 is a bottom plan view of the device shown in Fig. 1.

Fig. 3 is a sectional view taken on the line 3—3 of Fig. 2.

Fig. 4 is a side elevational view of the device shown in Figs. 1, 2 and 3.

Fig. 5 is a sectional view taken on the line 5—5 of Fig. 1.

Fig. 6 is a detail perspective view of the mechanism for segregating a record from a pile of records.

Fig. 7 is a fragmentary top plan view of the mechanism shown in Fig. 6.

Fig. 8 is a fragmentary end elevational view of the mechanism shown in Fig. 7.

Fig. 9 is a sectional view taken on the line 9—9 of Fig. 7.

Fig. 10 is a fragmentary detail view of the encore clutch.

Fig. 11 is a fragmentary top plan view of the record centering mechanism.

Fig. 12 is a sectional view taken on the line 12—12 of Fig. 11.

Fig. 13 is a detail perspective view of the pivot platform for the returning record.

Fig. 14 is a detail perspective view of the plate upon which the legs of the pivot platform rest.

Fig. 15 is a fragmentary sectional view of the mechanism for lifting the rear end of the pile of records.

Fig. 16 is a fragmentary view partly in section of the record shifting lug upon the conveyor chain.

Fig. 17 is a fragmentary top plan view of the conveyor chain and rear lift for the record stack.

Fig. 18 is a detail perspective view of the tone arm swinging and stack lifting lever.

Figure 19:
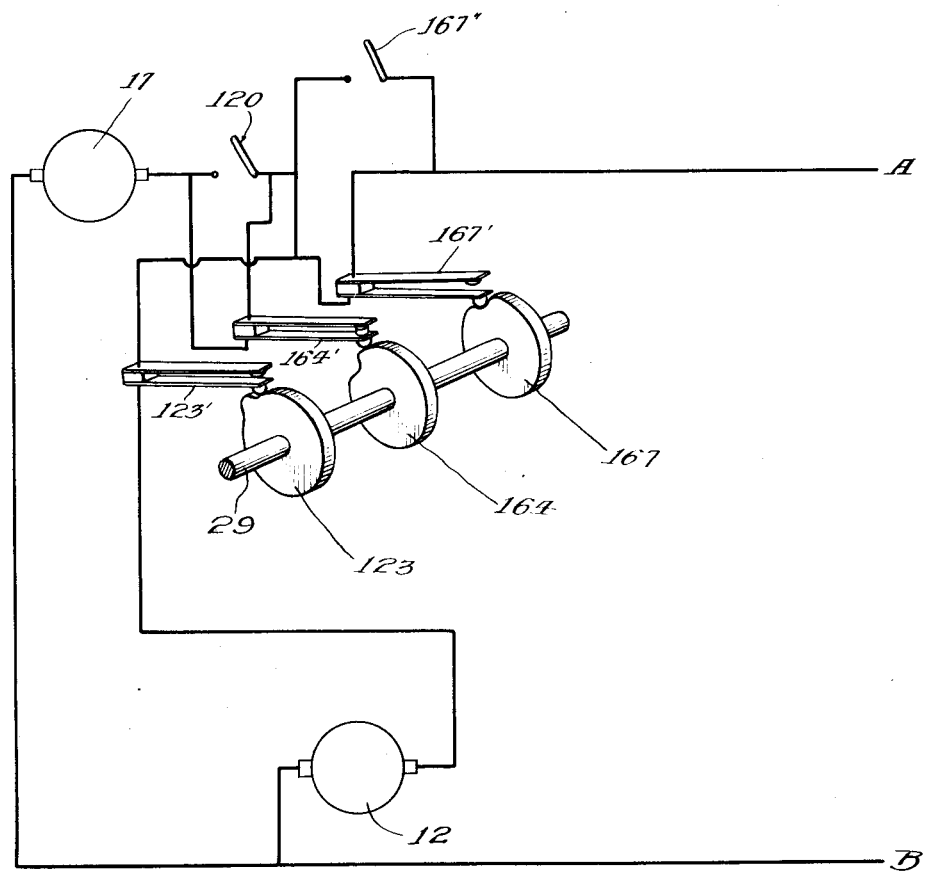
Fig. 19 is a diagrammatic view of the electrical connection to the record changing and turntable motor.

Referring in detail to the drawings, 1 indicates a frame or platform divided into two sections by transverse partition 2. A magazine 3 adapted to hold a plurality of phonograph records may be positioned on one side of the partition 2, said magazine being provided with side guards 5 and a rear guard 6. The guard 6 may be arcuate in shape and may be provided at its lower end with a slot 7 of thickness greater than the thickness of the usual phonograph record, but less than the thickness of two records. The purpose of said slot will be hereinafter more fully described.

A turntable 8 may be positioned upon the opposite side of the partition 2 on the upper portion of the platform 1, and may be adapted to hold a phonograph record in playing position. A tone arm 9 may be mounted upon the upper portion of the platform 1, and may be adapted to swing horizontally over said platform. A pick-up 10 of any suitable type may be mounted upon the end of tone arm 9 and may be adapted to change the mechanical vibrations impressed upon a phonograph record to electrical impulses which may be amplified and reproduced by suitable amplifying and reproduction devices not shown. Connection may be made between the pick-up 10 and said amplifier by means of the conductor 11 which may pass through the tone arm 9.

The turntable 8 may be rotated, when a record thereon is being reproduced, by means of a motor or the like 12, which may be mounted upon the lower side of the platform 1 by means of suitable bolts 13. The turntable shaft 14 may be operatively connected to the shaft of motor 12 by suitable reduction gears contained within the housing of the motor 12 and not shown. The turntable proper may be loosely mounted upon the shaft 14 and may be operatively connected to said shaft by means of downwardly projecting pins 15 which are adapted to seat in registering apertures in collar 16 slidably keyed upon shaft 14. The purpose of this construction will be hereinafter more fully described.

A motor 17 may be mounted upon the lower side of the platform 1 by means of bolts or the like 18 and may be adapted to drive the record changing mechanism which will be hereinafter described in detail. A pulley 19 may be mounted upon the shaft of the motor 17 and a belt 20 may operatively connect said pulley to a driven pulley 21 mounted upon shaft 22 which may, in turn, be journalled in frame 23 disposed upon the lower side of the platform 1. Pinion 24 may be positioned upon the opposite end of the shaft 22 and is adapted to mesh with worm wheel 25 mounted upon shaft 26 which may also be journalled in the frame 23. A spur gear 27 may be mounted upon the shaft 26 and may be adapted to turn in unison with the worm wheel 25. Spur gear 27 meshes with a cooperating gear 28 positioned upon an intermediate portion of shaft 29 also journalled in the frame 23. As will be hereinafter more fully described shaft 29 carries a plurality of cams utilized in operatively positioning the tone arm upon the record 30 in playing position upon the turntable 8. The operation of said cams will be hereinafter more fully described. Gear 28 in turn meshes with spur gear 29' loosely mounted upon shaft 31 upon which is mounted a plurality of cams utilized in the changing of records from the turntable 8 to the pile 4 and the shifting of the lowermost record of the pile 4 to the turntable 8. This operation will be subsequently described more in detail.

A clutch plate 32 may be slidably and non-rotatably mounted upon shaft 31 and may be moved longitudinally a limited distance along said shaft by means of rod 33 which terminates in handle 34. Plate 32 may carry a collar 35 and a pin 36 may extend diametrically through said collar, said pin being adapted to be operatively inserted in slot 37 provided in the shaft 31. A lug 38 may be pivotally mounted upon the periphery of plate 32 and may be adapted to ride adjacent one surface of the spur gear 29'. Spur gear 29' may be provided with a plurality of apertures 39 into which the end 40 of the lug 38 is adapted to be inserted. The lug 38 is normally impelled toward the surface of the gear 29' by means of spring 41. It can readily be seen from this construction that if the handle or knob 34 is pulled outwardly pulling rod 33 therewith, clutch 32 will be removed from its position adjacent the gear 29' and the end 40 of lug 38 will be disengaged from one of the apertures 39. This permits spur gear 29' to rotate freely upon shaft 31. By pressing the knob 34 inwardly, clutch plate 32 is brought to a position adjacent the surface of the gear 29' and lug 38 impelled by spring 41 engages in one of the apertures 39 thereby operatively connecting shaft 31 and gear 29' which, in turn, imparts motion to shaft 31. The arrangement is such that the tone arm 9 may be operatively positioned with respect to the record 30 upon the turntable 8 independently from the remaining portions of the record changing device. This construction permits an interruption in the sequential playing of the stack of records 4 by permitting the operator to repeat the reproduction of a record upon the turntable, if desired, without interfering in any way with the timing of the remaining mechanism.

In an automatic record changing device wherein a stack of records is maintained and a lowermost record removed from the stack to a phonograph turntable where the record may be reproduced and subsequent to reproduction removed from the turntable and disposed upon the upper portion of the stack, difficulty has been encountered in the removal of the lowermost record to the turntable. In automatic mechanisms of this type the entire weight of the stack of records bears upon the lowermost record of the stack and hence, in sliding said record from its position beneath the stack the surface of the record is injured. My invention is directed in one of its aspects to the overcoming of this difficulty and the means and method of so solving this problem will be hereinafter fully described.

Referring particularly to Figs. 1, 6, 7, 8 and 9, the means for removing the lowermost record from a stack of records is shown and comprises a bar 42 slidably positioned adjacent partition 2. Bar 42 may be provided with a plurality of slots 43 and screws 44 mounted upon one side of the partition 2 are adapted to be positioned in said slots. In other words, the heads of the screws 44 serve as a guiding means for the longitudinal shifting of the bar 42. Pins 45 may project outwardly from the surface of the partition 2 and may pass through slots 46 in bar 42. An angular supporting structure 47 may be mounted on a portion 48 of the frame 1 by means of screws or the like 49, and a plate 50 may be pivotally mounted upon the upper portion of the angular member 47. The arrangement is such that the plate 50 may be rotated about the pivot screw 51 in a horizontal plane, and sufficient play is permitted in the connection between the screw 51 and the plate 50 to permit the raising of the outer end of the plate 50 as shown best in Fig. 8. In other words, screw 51 serves as a universal pivot point about which plate 50 is permitted to swing within a limited range in a horizontal plane and also permitted to be displaced a limited distance in a vertical plane.

The plate 50 may be provided at its outermost end with a downwardly projecting angularly bent lug 52 of a thickness relatively smaller than the average thickness of a phonograph record. The plate 50 may be provided at an intermediate portion thereof with an angular shaped slot 53 through which pin 54 mounted upon member 55 is adapted to extend. The member 55 is in turn mounted upon bar 42 and is adapted to move therewith. An element 56 may be mounted upon the upper face of the plate 50 adjacent a portion of the slot 53 and is provided with an angularly bent end 57 which extends over a portion of the slot 53 at an angle inclined from the surface of the plate 50.

Each plate 50 mounted upon the angle members 47 are disposed adjacent each end of the slidable bar 42. The plates 50 adjacent each end of the bar 42 are not identical but are similar in construction and the arrangement is such that by movement of the bar 42 in a longitudinal direction the ends of said plates carrying the lugs 52 are first moved horizontally through a relatively small angle and are thence raised vertically a relatively slight distance. As will be apparent to any one skilled in the art, the shape of the slots in the two plates 50 will be slightly different to accomplish this motion.

One end of the bar 42 may be provided with a downwardly extending projection 58 mounted upon the lower end of which is a roller or follower 59 adapted to operate in and be guided by slot 60 formed in the surface of cam 61 mounted upon shaft 31. The configuration of slot 60 is such that upon one complete rotation of shaft 31, followed 59 and hence bar 42 is displaced a distance equal to the pitch of the slot 60, that is, bar 42 moves inwardly and outwardly a distance equal to said pitch when shaft 31 revolves once.

As shaft 31 revolves, referring particularly to Fig. 6, bar 42 may be moved to the left thereby moving pin 54 within slot 53 to the left. As said pin travels through slot 53, the same will contact the inclined surface of the inner portion of said slot and the plate 50 will be revolved outwardly. Referring particularly to Figs. 7, 8 and 9, as said plate revolves lug 52 will contact the outer edge of the lowermost record of the stack 4 and will displace the same to an eccentric position with respect to said stack, the opposite end of said displaced record being adapted to be inserted in the slot 7 of the rear guard 6. Upon further motion of the bar 42 the upper portion of pin 54 may contact the lower inclined surface of the member 57 and, hence, the plate 50 will be raised vertically. As the plate thus raises, the lug 52 now positioned beneath the stack of records 4, will raise said stack and will remove a portion of the weight of said stack from the lowermost record. The plate 50 in raised position is shown best in Fig. 8, and said plate in its horizontally rotated position is shown best in Figs. 7 and 9.

Assuming motor 17 to be in operation and clutch 32 to be engaged with gear 29' thereby rotating shaft 31, rotation may be imparted to shaft 62 mounted immediately above shaft 31. Said rotation is imparted to shaft 62 by the meshing of gear 63 with gear 29', gear 63 being mounted upon shaft 62. A sprocket wheel 64 may also be mounted upon shaft 62 and is adapted to cooperate with sprocket chain 65 which may travel thereover. A sprocket wheel 66 may be mounted at the opposite end of the frame 1 over which the chain 65 is also adapted to pass. The upper travel of the sprocket chain 65 is toward the turntable end of the frame 1 and said chain is disposed immediately beneath the stack of records 4. The lowermost record of the stack of records 4 rests upon supports 67 and 68, and a housing 69 is provided along the path of travel of the sprocket chain 65 upon which said lowermost record also rests. The housing 69 may be provided with a longitudinal slot 70 through which a lug 71 carried by chain 65 is adapted to travel, the upper portion of said lug extending above the upper surface of the housing 69 a distance less than the thickness of the average phonograph record.

As shaft 62 rotates, lug 71 is carried in slot 70 and upper portion of said lug contacts the rear end of the lowermost record of the stack 4 as shown best at 72 in Fig. 16. Said record will be carried forwardly by the movement of the chain and will eventually be deposited upon the turntable 8.

A lever 73 may be mounted beneath the platform 1 upon shaft 74, said lever extending upwardly from said shaft, a roller 75 may be rotatably mounted upon an intermediate portion of said lever and may be adapted to normally contact the peripheral surface of cam 76. A lug 77 may be pivotally mounted at the upper end of lever 73 and may be connected at its end to a link 78. The opposite end of link 78 may be pivotally connected to a lever 79 which may be swingably mounted upon the lower surface of the platform 1 as shown best at 80 in Fig. 2. A lug 81 may be carried by lever 79 at an intermediate portion thereof and may be provided with a downwardly extending contacting portion 82 which may be adapted upon swingable motion of said lever to contact downwardly extending arm 83 of lever 84. Lever 84 may be pivotally mounted upon the side of the housing 69 as shown best at 85 in Fig. 5 and said lever may be provided at its upper edge with an upwardly extending lug 86. The downward motion of the lever 84 may be limited by the pin 87 mounted upon the side of the housing 69.

The arrangement is such and the angular rotation of the shaft 29 with respect to the positioning of the cam 76 thereon is so timed that immediately subsequent to the passing of the lug 71 carried by sprocket chain 65 over the position occupied by the lug 86 carried by the lever 84, that link 78 motivated by the contact of roller 75 and cam 76 swings towards the downwardly extending arm 83 of the lever 84 when the element 82 of the lug 81 contacts the downwardly extending arm 83 of the lever 84, said lever is raised thereby permitting lug 86 to contact the bottom of the stack of records 4 and raise the same thus relieving the lowermost record carried by the sprocket chain 65 from the weight of the rear portion of the stack of records.

It can readily be seen that by this construction a record may be removed from the bottom of the stack of phonograph records without permitting the remaining portion of said stack of records to rest upon said lowermost record during its removal. As has been hereinbefore described, the lowermost record is first displaced rearwardly with respect to the stack of records 4 by means of the swinging plates 50 and lugs 52 carried thereby. The remaining records of the stack are then lifted from contact with the front portion of the displaced record. Subsequent to the rearward displacement of the lowermost record the rear edge of said record is contacted by the lug 71 carried by the chain 65 and is moved forwardly. After said record has moved forwardly a predetermined distance, the rear portion of the stack of records 4 is raised and, hence, the weight of said stack rests upon the two lugs 52 and the upper portion of lug 86, while the lowermost record continues its travel to the turntable.

As has been hereinbefore described, the lowermost record may be carried forwardly toward the turntable 8 by the chain 65 while the remaining stack of records is held in up-raised position upon the lugs 52 and the lug 86. The lowermost record in being so carried passes through slot 88 provided in partition 2. Simultaneously with the passage of the record through said slot, cam 89 having an up-raised face 90, comes in contact with pin 91, thereby depressing follower 91 and hence depressing lever 92 pivotally mounted at 93 upon the end of a downwardly projecting standard 94 attached to the lower portion of the frame or platform 1. The cam 89 may be mounted upon shaft 31, the rotation of which is controlled by clutch 32. As the follower 91 is depressed, the opposite end of lever 92, which may be bifurcated as shown best at 95 in Fig. 2, is raised and comes into contact with the lower portion of the collar 16 which surrounds turntable shaft 14. In this manner collar 16 is elevated carrying therewith turntable 8. The geometrical proportions of the cam 89 are such that lever 92 may raise turntable 8 to a plane substantially coincident with the plane of the lower face of the record passing through slot 88. In addition, when turntable 8 thus raises its plane may be elevated above the upper end of the turntable shaft 14 and, hence, the record passing through slot 88 slides upon the upper portion of the turntable 8 and is unimpeded by the turntable shaft 14.

When the lug 71 upon chain 65 reaches its extreme position toward the sprocket wheel 64, the major portion of the record carried by said lug will be positioned upon the turntable 8 but said record will not as yet be properly centered upon the turntable. Immediately subsequent to the passage of the lug 71 around the sprocket wheel 64, a wheel 96 mounted upon shaft 31 and carrying L shaped element 97, rotates to a position as shown best in Fig. 12. The element 97 may be pivotally mounted upon the side surface of the wheel 96 as shown best at 98. The outer end of said element may be provided with a contacting member 99 which, upon rotation of wheel 96 in a clockwise direction, contacts the downwardly extending arm 100 which may be rigidly mounted upon shaft 101. A plurality of fingers 102 is also mounted upon the shaft 101 and is adapted to turn with said shaft, consequently upon the rotation of the wheel 96 in a counter-clockwise direction, arm 100 may be swung to a position shown in dotted lines in Fig. 12 by the contacting of the element 99 with said arm. In this manner the shaft 101 is rotated in a clockwise direction and hence, fingers 102 are swung to a position shown in dotted lines in Fig. 12.

As shown best in Fig. 1, shaft 101 is so positioned with respect to turntable 8 and with respect to the position at which lug 71 disengages the rear end of the record carried by said lug, that fingers 102 when swung into up-raised position contact the rear end of the record and push the same forwardly to a central position upon turntable 8. Simultaneously with the motion of the fingers 102, shaft 31 will have rotated to such a position as to permit follower 91 to break contact with the up-raised surface 90 of the cam 89. Hence, the follower 91 will be elevated permitting the depression of the bifurcated end 95 of the arm or lever 92 and hence permitting the descent of the turntable 8 carrying therewith record 30 properly centered upon said turntable.

The opposite leg 103 of the L shaped element 97 may be connected to a fixed point upon the side surface of the wheel 96 by means of tension spring 104. Rotation of the element 97 by the action of said spring may be prevented by pin 105 positioned adjacent one edge of said element. By this construction if the record being placed upon turntable 8 meets with any obstruction at the period when fingers 102 are being swung into contact with the edge of said record, the resistance encountered by the fingers 102 in attempting to move said record to its central position upon the turntable is sufficient to flex spring 104 and thereby permit element 97 to rotate and consequently permit contacting member 99 to pass beneath the arm 100. By this provision if an obstruction is met by the record being placed upon the turntable, said record will not be broken due to the impelling force of the fingers 102, inasmuch as said force will be no greater than the force of tension of the spring 104.

The tone arm 9 may be pivotally connected at its end as shown best at 106 in Fig. 3, to a lug 107 positioned upon the upper portion of a cylindrical support 108. The support 108 may be of hollow construction and a second hollow shaft 109 may be positioned concentric with the cylinder 108 and within said cylinder. The shaft 109 may be attached at its upper end to the tone arm 9. The arrangement is such that the tone arm, the shaft 109 and the lug 107 may revolve as a unit. A plunger 110 may be positioned within the shaft 109 and may terminate at its upper end adjacent the upper portion of the tone arm 9, and may be adapted upon upward longitudinal motion of the plunger to raise said tone arm about the pivot point 106.

A cross arm 111 may be mounted upon the lower end of the hollow shaft 109 and the arrangement is such that upon rotary motion of the cross arm 111, the same may be imparted through the shaft 109 to the tone arm 9. The cross arm 111 may terminate at one end in a downwardly projecting pin 112. The opposite end of said cross arm positioned upon the opposite side of the connection between the hollow cylinder 109 and the cross arm shown best at 113 in Fig. 2, may carry a roller 114.

A plate 115 may be mounted upon one side of the platform 1 and may extend downwardly from the surface of said platform. Said plate may carry a lever arm 116 which may be pivoted thereto as shown best at 117 in Fig. 4. A spring, not shown, may normally impel lever arm 116 in an upward or counter-clockwise direction about pivot point 117. A lug 118 may be mounted upon an intermediate portion of the lever 116 and may be provided with an inclined upper surface. The lever 118 may be notched as shown best at 119 in Fig. 4. A mercoid switch 120 may be pivotally attached to the plate 115 at 121 and may be provided with an upwardly extending finger or arm 122 adapted to engage in slot 119. A spring, not shown, may be attached to the upper portion of the fingers 122 and may be adapted to normally rotate said finger and also the mercoid switch in a clockwise direction as viewed in Fig. 4.

Assume, for the sake of example, that tone arm 9 is positioned immediately above the starting point upon record 30 on the turntable 8 and that pick-up 10 is in operative contact with said record. Motor 12, of course, will be in operation and as record 30 is reproduced, arm 9 will swing toward the center of said record until said arm reaches a position immediately above the end of the convolutions of the record adjacent its central portion. At this period roller 114 will contact the inclined surface of lug 118 and will depress said lug which, in turn, depresses lever 116 thereby disengaging fingers 122 from slot 119. By the impelling force of the spring not shown attached to finger 122, said finger and hence mercoid switch 120, will be rotated in a clockwise direction and contacts contained in the end of said mercoid switch not shown will be bridged thereby connecting motor 17 into circuit.

As the motor 17 drives its accompanying mechanism, that is, the gears 27 and 28, shaft 29 will be rotated. A cam 123 mounted upon said shaft will engage arm 124 which is operatively connected to a switch, not shown, contained within switch box 125. By the contact of the cam 123 with the arm 124, said switch acts to disconnect motor 12 from circuit thereby stopping the revolution of the turntable 8.

At the same time upon rotation of the shaft 29, a cam 126 mounted thereon contacts follower 127 mounted upon the end of lever arm 128 and will depress said follower. Lever arm 128 is pivoted at the fulcrum 129 mounted upon the lower surface of the frame 1 as shown best at 130 in Fig. 4. The opposite end of said lever may be disposed immediately below the lower end of the plunger 110, consequently when follower 127 is depressed, the opposite end of said lever will be brought to an up-raised position and hence will contact the lower end of the plunger 110 which, in turn, raises tone arm 9 until pick-up 10 is raised above and out of contact with the record 30.

At this period of operation of the device, link 131 connected to the end of lever 73 is displaced toward the right as shown in Fig. 2 by contact of roller or follower 75 with cam 76. An arm 132 may be pivotally attached at one end 133 to the lower surface of platform 1. The opposite end of said arm may be forked or bifurcated providing two arms 134 and 135 at said opposite end. The pin 112 may project downwardly between arms 134 and 135. Link 131 may be attached at its opposite end to an intermediate portion of the arm 132 as shown best at 136 in Fig. 2. Consequently it can be readily seen that as link 131 is displaced toward the right as shown in Fig. 2, arm 132 may be rotated in a counter-clockwise direction and hence member 134 will contact the downwardly projecting pin 112 and will rotate cross arm 111 in a clockwise direction. This rotation of the cross arm results in swinging tone arm 9 in its up-raised position over the surface of the record 30 to a point adjacent the edge of the turntable 8.

After record 30 has been reproduced as has been hereinbefore described, the same must be returned to the top of the stack 4. To accomplish this a shaft 137 may be mounted upon the upper portion of the platform 1 and may be journalled in suitable supports 138. Arms 139 may be carried by said shaft and may normally lie in a plane parallel to the plane of the platform 1. The ends of the arms 139 may be provided with flanges 140 which may normally be positioned adjacent the periphery of the turntable 8, said flanges when a record is disposed upon said turntable, being positioned beneath the edges of the record.

A segmental gear 141 may be mounted upon one end of the shaft 137 and is adapted to mesh with segmental gear 142 formed upon the upper end of lever 143. A cam 144 may be mounted upon shaft 31 and may be adapted to contact an intermediate portion of the lever 143. It can readily be seen that by this arrangement when the up-raised portion of cam 144 contacts lever 143 pivoted at 146, said lever may be rotated thereby rotating gear 142 and hence gear 141 which, in turn, may swing arms 139 upwardly. As shown best in Fig. 5, said arms then swing record 30 into the position shown in dotted lines in said figure until said record is rotated or swung through an angle greater than 90° from the position occupied by said record upon the turntable 8. The record may then fall by gravity to a position upon the upper portion of the stack 4.

As record 30 is raised in the manner hereinbefore described, the lower edge of said record may rest upon platform 147 the upper surface of which is normally maintained in a plane substantially coincident with the plane of the record 30 when the same is on the turntable 8. When the arms swing upwardly to remove the record, a lug 148 positioned upon collar 149 which in turn may be rigidly mounted upon shaft 137, contacts the outwardly projecting edge 150 of plate 151. Plate 151 may be fulcrumed upon projection 152 which, in turn, may be mounted upon the upper surface of platform 1. Lugs 153 may rest upon the ends 154 of plate 151 and consequently as shaft 137 rotates, end 150 of the plate 151 is depressed, the opposite end of said plate containing the projection 154 will be raised thereby raising platform 147.

At this period arms 139 will have swung record 30 to substantially a vertical position upon platform 147, consequently it can be seen that the point about which record 30 rotates when the same is being swung by arms 139 from the turntable to upper portion of the stack 4 is raised and permits record 30 to more easily fall to a position upon the stack of records. By this provision the capacity of the device is increased inasmuch as more records may be maintained in the stack and yet a returned record may be properly positioned upon the top of the stack even though the stack is relatively high.

After record 30 has been deposited upon the upper portion of stack 4, the same must be centered thereon. To accomplish this object shaft 155 may be vertically mounted upon the upper portion of platform 1 adjacent the turntable 8. Said shaft may be provided with an outwardly projecting arm 156 upon the end of which may be mounted element 157. Shaft 155 may project through the surface of platform 1 and may be connected beneath said platform to an arm 158. A link 159 may be pivotally attached to the end of arm 158 and the opposite end of said link may be pivotally mounted upon the upper end of lever 160 as shown best at 161 in Fig. 4. A cam 162 may be mounted upon shaft 31 and a roller or follower 163 may be disposed upon an intermediate portion of lever 160, said roller being adapted to be maintained in contact with the surface of the cam 162. It can readily be seen that as shaft 31 continues its rotation, the up-raised portion of cam 162 may contact roller 163 and lever 160 will swing carrying link 159 and thereby rotating shaft 155, swinging arm 156, and establishing contact between element 157 and the edge of the record just returned to the upper portion of the stack 4. In this manner said record may be displaced backwardly upon the top of the stack 4 until the rear edge of said record contacts the rear guard 6 of the magazine.

During these latter operations, chain 65 will be rotated to a position where the lowermost record of the stack will be displaced toward the turntable. This operation has been hereinbefore described and is believed needs no further description at this time. Assume, for the sake of example, that the next record has been positioned upon turntable 8. Tone arm 9 at this period occupies a position adjacent the edge of the turntable 8 and has the pick-up end thereof elevated above the surface of said record. To apply the needle of the pick up to the record, link 131 connected to arm 132 may be moved as viewed in Fig. 2 to the left. This motion, of course, is accomplished by the peculiar configuration of the cam 76. Arm 132 may be swung in this manner until element 135 of said arm contacts the downwardly projecting pin 112 of the cross arm 111 and moves the same in a counter-clockwise direction, thereby rotating the hollow shaft 109 and, hence, the tone arm 9 until the pick up is brought to a position immediately above the beginning of the convolutions upon the record. At this period, cam 126 may be rotated to a point which will permit follower 127 to rise as shown in Fig. 4, thereby permitting plunger 110 to descend and hence lower the needle of pick up 10 to the surface of the record upon the turntable.

At this period cam 123 mounted upon shaft 29 will again act to connect motor 12 into circuit and cam 164 will act to disconnect motor 17, thereby stopping the revolutions of the shafts 29 and 31.

To automatically start motor 17 at the beginning of the record changing operation, mercoid switch 120 must be in set position, that is, the finger 122 associated with said mercoid switch must be disposed in the notch 119 of the lever 116 so that at the end of the reproduction period said mercoid switch may act to again connect motor 17 into circuit. To reset finger 122 into the notch 119, a projecting pin 165 may be associated with the mercoid switch 120 and an arm 166 mounted upon an intermediate portion of link 131 may contact said pin when link 131 acts to remove the tone arm from tis position at the substantial center of the record to its nonplaying position adjacent the edge of the turntable. It can be seen by this arrangement that switch 120 is reset to connect motor 17 while said motor is already in operation. In other words, switch 120 operates in parallel with switch contained in switch box 125 which may be actuated by cam 164, the arrangement being such in general that switch 120 may act to connect motor 17 into circuit. Cam 123 operating in conjunction with a switch in the switch box 125 may act to disconnect motor 12 from circuit.

To illustrate the switching operations in conjunction with the various positions of the elements constituting my device, assume that the record on the turntable is being played. At this period cam 167 has operated to close switch 167', cam 164 has acted to open switch 164', the mercoid switch 120 is open and, hence, motor 17 is out of circuit with respect to the input terminals A and B. Cam 123 has previously acted to close switch 123' and, hence, the turntable rotates. When the tone arm reaches the final playing position, the mercoid switch 120, previously set, is closed connecting motor 17 into circuit. This revolves shaft 29 and moves cam 123 to such a position as to open switch 123' and stop motor 12. Simultaneously cam 164 is so rotated as to close switch 164' which is connected in parallel with the mercoid switch 120. When the motor 17 is set in operation, the tone arm raises from the record and swings outwardly from the center of the record thereby opening mercoid switch 120 and resetting the same. The record changing operations hereinafter described then take place and a new record is deposited upon the turntable and the tone arm placed at its initial playing position when switch 167' is opened. However, since switch 167' is the main control switch, in order to play the record on the turntable an auxiliary short-circuit switch 167'' may be closed long enough to move the shaft 29 closing switch 167' and switch 123' and opening switch 164'. The switch 167'' may be a manually operated switch which may short circuit switch 167' in which case continuous operation of the machine will take place, or the switch 167'' may be a portion of a coin operated mechanism whereby the switch 167' is short circuited by a deposited coin long enough to close switch 167', open switch 164' and close switch 123'.

One complete cycle of operation of my machine may be as follows: Assuming a stack of records 4 within the magazine and further assuming that motor 17 is in operation and clutch 32 so engaged with gear 29' as to permit the rotation of shaft 31. Sprocket chain 65 will be set in motion and cam 61 will be rotated. As said cam rotates the bar 42 will be displaced longitudinally in such a manner as to permit lugs 52 of the plates 50 upon each side of the magazine to displace the lowermost record of the stack rearwardly until the rear edge of said lowermost record occupies a position within slot 7. At this period the ends of plates 50 will be raised thereby raising the front portion of the stack of records 4. The timing is such that immediately subsequent to this operation lug 71, carried by chain 65, will contact the rear end of the lowermost record and will carry the same forwardly toward the turntable. As the lug 71 upon the sprocket chain passes the position occupied by the lug 86 upon lever 84, said lever will be raised and the rear end of the remaining portion of the stack of records will be raised therewith. In this manner the entire weight of the stack of records 4 instead of resting upon the lowermost record being displaced, rests upon the two lugs 52 and the lug 86. In this manner the lowermost record is free to move toward the turntable without being scratched.

When the lug 71 carries the lowermost record to the extremity of the magazine, said record will be deposited upon the upper surface of the turntable which, in the meantime, has been raised by mechanism which has been hereinbefore described until the upper surface of the said turntable lies substantially in the same plane as the lower surface of the record from the magazine. At this period the fingers 102 will rotate to a position wherein they contact the rear edge of the record and properly center said record upon the turntable. Simultaneously the turntable lowers and the turntable shaft 14 projects through the central aperture of the record.

The tone arm 9 carrying the pick up 10 is then swung to a position immediately above the starting position of the convolutions upon the record 30. This motion is accomplished by the mechanisms associated with the arm 132 and the link 131. The plunger 110 is then permitted to descend by the depression of the lever 128 caused by the contact of the follower 127 with a depressed portion of cam 126. In this manner the needle carried by the pick up 10 is brought into operative contact with the upper surface of the phonograph record.

By suitable switching mechanism hereinbefore described, motor 17 is stopped and motor 12 is brought into circuit and the record upon the turntable is reproduced. When tone arm 9 reaches the end of its swing toward the center of the record, that is, when the record has been completely reproduced, cross arm 111 carrying roller 114 depresses lever 116 and permits mercoid switch 120 to be canted in the opposite direction, thereby connecting motor 17 into circuit.

Substantially the first action that takes place when motor 17 has been brought into circuit is the raising of the tone arm 9 until the needle carried by pick up 10 is removed from contact with the surface of the record 30. This motion is brought about by the contact of the follower 127 upon the lever 128 with an up-raised portion of cam 126 which depresses said follower and hence elevates the opposite end of said lever which, in turn, raises the plunger 110 and hence elevates the tone arm 9. At this time cam 76 operates to displace link 131 and arm 132, thereby swinging the cross arm 111 and hence swinging the tone arm 9 from its position adjacent the center of the record to a position adjacent the edge of the turntable. As arm 132 swings cross arm 111 to accomplish this motion of the tone arm, the projecting arm 166 contacts pin 165 and resets switch 120.

The arms 139 are then raised carrying record 30 upon the flanges 140. As said arms approach a substantially vertical position, the platform 147 is raised and a record falls by gravity to the upper portion of the stack 4. At this period shaft 155 is rotated by lever 160 and the contacting element 157 acts to displace the record deposited upon the upper portion of the stack to the rear until the rear edge of said record contacts the rear guard 6. In this manner a complete cycle of operation of the device takes place.

If it is desired to repeat the reproduction of a record already upon the turntable 8, the clutch 32 may be disengaged from the spur gear 29' thereby stopping the rotation of the shaft 31. The arrangement is such that the action of all the mechanisms associated with said shaft is interrupted, namely, the chain 65, the arms 140, the centering element 157, and platform 147, the centering fingers 102 and the plates 50, whereas the action of the mechanisms associated with the shaft 29 is continued, namely, those actions pertinent to the motion of the tone arm 9. In this manner a record upon the turntable may be repeated without interfering with the sequential operation of the record changing apparatus.

It is apparent that herein is provided means for relieving a record being removed from a stack of records, from the weight of the remaining records of said stack during the period of the removal of the selected record. In addition, means is provided for repeating the reproduction of a record already on the turntable without interfering with the timing of the mechanism as a whole. Further, means for raising the axis of revolution of a record being returned from the turntable to the top of the stack of records in the magazine is provided, as is the provision of means for raising the turntable to substantially the same level as the lower surface of the record delivered from the magazine.

It is to be understood, of course, that many of the component parts of the record changing device, herein described, as a whole are known to the art. Consequently, I do not wish to be limited in the use of my improvements to any one specific mechanism inasmuch as the same may be utilized in combination with many forms of automatic record changing devices for phonographs.

I claim as my invention:

1. In combination, a device for automatically removing the lowermost record of a stack of phonograph records which comprises, means for displacing said lowermost record to an eccentric position with respect to the remaining records in said stack, means for raising the overhanging portion of said stack, means for displacing said lowermost record in another direction, and means for raising that portion of the stack of records overhanging the lowermost record in its second displaced position when said record has been displaced a relatively short distance.

2. In combination, a device for automatically removing the lowermost record of a stack of phonograph records which comprises, means for displacing said lowermost record to an eccentric position with respect to the remaining records in said stack, means for raising the overhanging portion of said stack, means for displacing said lowermost record in a substantially opposite direction from the direction of the first displacement, and means for raising that portion of the stack substantially opposite the portion already raised from the lowermost record when said lowermost record has been displaced a relatively short distance.

3. In combination, a device for automatically removing the lowermost record of a stack of phonograph records which comprises, means for displacing said lowermost record to an eccentric position with respect to the remaining records in the stack, comprising a magazine for holding the stack of records, a plurality of plates pivotally mounted upon said magazine adjacent said record, means upon said plates for contacting the edge of the lowermost record, means for rotating said plates to displace said lowermost record, means for raising the overhanging portion of said stack, means for displacing said lowermost record in another direction, and means for raising that portion of the stack of records overhanging the lowermost record in its second displaced position when said record has been displaced a relatively short distance.

4. In combination, a device for automatically removing the lowermost record of a stack of phonograph records which comprises, a magazine for holding said stack of records, means for displacing the lowermost record to an eccentric position with respect to the remaining records in said stack, comprising a plate pivotally mounted upon said magazine adjacent the edge of said lowermost record, and means for moving a portion of said plate beneath the overhanging portion of said stack, means for raising the overhanging portion of said stack, means for displacing said lowermost record in another direction, and means for raising that portion of the stack of records overhanging the lowermost record in its second displaced position when said record has been displaced a relatively short distance.

5. In combination, a device for automatically removing the lowermost record of a stack of phonograph records which comprises, a magazine for a stack of records, means for displacing the lowermost record of said stack to an eccentric position with respect to the remaining records in said stack, means for raising the overhanging portion of said stack, a flexible member moving in an endless path adjacent said magazine, means upon said flexible member for contacting the edge of said lowermost record to displace the same in the opposite direction with respect to said stack, and means mounted upon said magazine for lifting the overhanging edge of said stack, formed by the second displacement of the lowermost record, when said contacting means has passed the position occupied by the lifting means.

6. An automatic phonograph comprising in combination, a magazine for holding a stack of phonograph records, a turntable disposed adjacent said magazine, means for transporting the lowermost record of said stack of records laterally to said turntable means associated with said magazine for raising the portion of said stack of records adjacent the turntable from the lowermost record, and means for subsequently raising the opposite portion of said stack of records from the lowermost record during the lateral transportation of said record to the turntable.

7. An automatic phonograph record changing device which comprises in combination, a magazine for holding a stack of phonograph records, a vertically movable turntable horizontally disposed adjacent said magazine, means for transporting the lowermost record of said stack of records to said turntable, means for raising the remaining stack of records out of contact with said lowermost record during the period of transportation, and means for disposing the plane of the turntable substantially coincident with the plane of the lower surface of said transported record when said record is being disposed upon said turntable.

8. An automatic phonograph record changing device which comprises in combination, a magazine for holding a stack of phonograph records, a turntable disposed adjacent said magazine, a shaft projecting upwardly through said turntable upon which the turntable is slidably but non-rotatably mounted, means for transporting the lowermost records of said stack of records to said turntable, means for raising the remaining stack of records out of contact with said lowermost record during the period of transportation, and means for disposing the plane of the turntable above the top of the turntable shaft when said record is being disposed upon said turntable.

HENRY G. SAAL.